(12) United States Patent
Shiotsuki et al.

(10) Patent No.: US 8,143,351 B2
(45) Date of Patent: Mar. 27, 2012

(54) FLUORORESIN COMPOSITION AND COVERED ELECTRIC WIRE

(75) Inventors: Keizo Shiotsuki, Settsu (JP); Hideki Kono, Decatur, AL (US); Kenji Ishii, Settsu (JP); Kengo Ito, Settsu (JP); Kenjiro Tanimoto, Settsu (JP); Takahiro Kitahara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 158 days.

(21) Appl. No.: 12/674,070

(22) PCT Filed: Sep. 24, 2008

(86) PCT No.: PCT/JP2008/067777
§ 371 (c)(1),
(2), (4) Date: Feb. 18, 2010

(87) PCT Pub. No.: WO2009/044753
PCT Pub. Date: Apr. 9, 2009

(65) Prior Publication Data
US 2011/0272173 A1    Nov. 10, 2011

Related U.S. Application Data

(60) Provisional application No. 60/977,468, filed on Oct. 4, 2007.

(30) Foreign Application Priority Data

Oct. 3, 2007  (JP) .................................. 2007-260399

(51) Int. Cl.
*C08L 27/12*    (2006.01)

(52) U.S. Cl. ...................................................... 525/199

(58) Field of Classification Search .................... 525/199
See application file for complete search history.

(56) References Cited

U.S. PATENT DOCUMENTS

| | | | |
|---|---|---|---|
| 4,743,658 A | 5/1988 | Imbalzano et al. | |
| 7,126,056 B2 | 10/2006 | Earnest, Jr. et al. | |
| 7,723,615 B2 * | 5/2010 | Kono et al. | ............... 174/110 R |
| 2004/0242783 A1 | 12/2004 | Yabu et al. | |
| 2004/0242819 A1 | 12/2004 | Earnest, Jr. et al. | |
| 2006/0276604 A1 | 12/2006 | Earnest, Jr. et al. | |
| 2009/0044965 A1 | 2/2009 | Kono et al. | |

FOREIGN PATENT DOCUMENTS

| | | |
|---|---|---|
| JP | 2002-293831 A | 10/2002 |
| JP | 2003-082106 A | 3/2003 |
| JP | 2007-145005 A | 6/2007 |
| WO | 2004052987 A1 | 6/2004 |
| WO | 2006/123694 A1 | 11/2006 |

OTHER PUBLICATIONS

Database WPI; Week 200710; Thomson Scientific, London, GB; AN 2007-101949; XP 002639211 & WO 2006/123694 A1 (Daikin Ind Ltd); Nov. 23, 2006.
Database WPI; Week 200449; Thomson Scientific, London, GB; AN 2004-517247; XP 002639212 & WO 2004/052987 A1 (Daikin Ind Ltd); Jun. 24, 2004.

* cited by examiner

*Primary Examiner* — Nathan M Nutter
(74) *Attorney, Agent, or Firm* — Sughrue Mion, PLLC

(57) ABSTRACT

It is an object of the present invention to provide a fluororesin composition which hardly causes molding defects even when high-speed molding is performed in covering extrusion molding within a relatively broad molding temperature range and which can give covered electric wires, in particular foamed electric wires, excellent in surface smoothness.

A fluororesin composition comprising a polytetrafluoroethylene [PTFE] having a standard specific gravity of 2.15 to 2.30 and a tetrafluoroethylene/hexafluoropropylene-based copolymer [FEP], the content of said PTFE being 0.01 to 3 parts by mass per 100 parts by mass of said FEP and the alkali metal content being not higher than 5 ppm on the resin composition solid matter basis, wherein said composition is obtained by a method comprising the step (1) of obtaining a cocoagulated fluororesin powder by mixing an aqueous dispersion containing said FEP and an aqueous dispersion containing said PTFE together, followed by coagulation, the step (2) of melt extruding the cocoagulated powder and the step (3) of subjecting the extrusion product to treatment for stabilizing unstable terminal groups in said PTFE and FEP.

9 Claims, No Drawings

FLUORORESIN COMPOSITION AND COVERED ELECTRIC WIRE

CROSS-REFERENCE TO RELATED APPLICATIONS

This Application claims benefit under 35 U.S.C. §119 (e) of U.S. Provisional Application No. 60/977,468 filed Oct. 4, 2007, incorporated herein by reference in its entirety.

TECHNICAL FIELD

The present invention relates to a fluororesin composition and a covered electric wire.

BACKGROUND ART

Fluororesins are excellent in such characteristics as thermal resistance, chemical resistance, solvent resistance and insulating properties and, therefore, such products as tubes, covered electric wires, pipes and filaments can be obtained by melt-extrusion molding them. In particular, fluororesins comprising a tetrafluoroethylene [TFE]/hexafluoropropylene [HFP]-based copolymer [FEP] are low in permittivity and dielectric loss tangent and have good insulating properties and are suitably used in the field of application as coverings for electric wires such as cables and wires.

The FEP-containing resin compositions so far proposed as being suited for use in covering electric wires are, for example, substantially alkali metal salt-free ones having an HFPI of about 2.8 to 5.3, a melt flow rate [MFR] of 30±3 g/10 minutes and a number of unstable terminal groups of not larger than about 50 per $1\times10^6$ carbon atoms (cf. e.g. Patent Document 1: U.S. Pat. No. 7,126,056; Patent Document 2: United States Patent Application Publication 2004/0242819; Patent Document 3: United States Patent Application Publication 2006/0276604). However, the temperature range employable on the occasion of molding the electric wire is very narrow, and the molding stability may rapidly decrease under conditions outside this temperature range.

A FEP-containing fluororesin composition which has a sodium metal element content of 5 to 100 ppm and contains 0.01 to 3 parts by mass, per 100 parts by mass of the FEP, of a polytetrafluoroethylene [PTFE] having a specific standard specific gravity and which is obtainable by mixing an aqueous FEP dispersion with an aqueous PTFE dispersion, followed by coagulation has been proposed (cf. e.g. Patent Document 4: International Publication WO 2006/123694).

DISCLOSURE OF INVENTION

Problems which the Invention is to Solve

In view of the above-discussed state of the art, it is an object of the present invention to provide a fluororesin composition which hardly causes molding defects even when high-speed molding is performed in covering extrusion molding within a relatively broad molding temperature range and which can give covered electric wires, in particular foamed electric wires, excellent in surface smoothness.

Means for Solving the Problems

The present invention relates to a fluororesin composition comprising a polytetrafluoroethylene [PTFE] having a standard specific gravity of 2.15 to 2.30 and a tetrafluoroethylene/hexafluoropropylene-based copolymer [FEP], the content of said PTFE being 0.01 to 3 parts by mass per 100 parts by mass of said FEP and the alkali metal content being not higher than 5 ppm on the resin composition solid matter basis, wherein said composition is obtained by a method comprising the step (1) of obtaining a cocoagulated fluororesin powder by mixing an aqueous dispersion containing said FEP and an aqueous dispersion containing said PTFE together, followed by coagulation, the step (2) of melt extruding the cocoagulated powder and the step (3) of subjecting the extrusion product to treatment for stabilizing unstable terminal groups in said PTFE and FEP.

The present invention relates to a covered electric wire comprising a core conductor and a covering made of the fluororesin composition mentioned above on the core conductor.

The present invention relates to a foamed electric wire comprising a core conductor and a covering made of the fluororesin composition mentioned above on the core conductor.

In the following, the invention is described in detail.

The fluororesin composition of the present invention possesses the following characteristic features:

(1) Since it contains a polytetrafluoroethylene [PTFE] having a standard specific gravity within a specific range in addition to a tetrafluoroethylene/hexafluoropropylene-based copolymer [FEP], molding defects can be inhibited in melt-extrusion molding thereof;

(2) Since it is substantially free of any alkali metal, discoloration or molding defects (spark-out, lump formation) hardly occur even in extrusion molding under high temperature conditions.

Since the above fluororesin composition is obtainable by cocoagulation from an aqueous FEP dispersion and an aqueous PTFE dispersion, the PTFE hardly agglomerates and PTFE particles occur uniformly mixed among FEP particles. Accordingly, as compared with resin compositions obtained by mere mixing of a PTFE powder with a FEP powder, the above fluororesin composition hardly causes molding defects, for example spark out, due to the agglutination of PTFE and, in addition, the effect of inhibiting the above-mentioned molding defects due to PTFE can be produced efficiently.

The mechanism by which this good effect is produced is not clear but it is presumable that PTFE particles will be sufficiently dispersed among FEP particles on the occasion of cocoagulation and, as a result, the entanglement among FEP molecules and PTFE molecules will be enhanced, so that even when low-molecular-weight byproducts formed in the step of polymerization occur in the resin composition, the low-molecular-weight byproducts will be inhibited from getting out and, thus, the adverse effect of getting out of the low-molecular-weight byproducts will be prevented. As the reason why the substantially alkali metal-free condition contributes to the inhibition of discoloration and/or molding defects, it is considered that the extent of thermal decomposition, which causes discoloration and/or molding defects, becomes reduced. Namely, the above-mentioned metals are thought to be able to promote thermal decomposition reactions of the resin and, therefore, the reduction in alkali metal content is expected to result in inhibition of thermal decomposition, hence in inhibition of discoloration and/or molding defects.

In the fluororesin composition according to the invention, the above-mentioned FEP is a fluorocopolymer comprising TFE-derived TFE units and HFP-derived HFP units and is melt-processable.

So long as it comprises TFE units and HFP units, the above-mentioned FEP may be one resulting from copolymerization with one monomer other than TFE and HFP or one resulting from copolymerization with two or more other monomers.

The other monomer is not particularly restricted but includes, for example, a perfluoro(vinyl ether) [PFVE], chlorotrifluoroethylene [CTFE], vinyl fluoride [VF] and hexafluoroisobutene.

The PFVE is not particularly restricted but there may be mentioned, for example, perfluoro unsaturated compounds represented by the general formula: $CF_2$=CF—ORf (in which Rf represents a perfluoro aliphatic hydrocarbon group).

The term "perfluoro aliphatic hydrocarbon group" as used herein means an aliphatic hydrocarbon group resulting from substitution, by fluorine atoms, of all hydrogen atoms therein as bound to a carbon atom or atoms. The perfluoro aliphatic hydrocarbon group may contain one or more ether oxygen atoms.

As the above PFVE, there may be mentioned, for example, perfluoro (alkyl vinyl ether) [PAVEs]. The PAVEs are compound represented by the general formula: $CF_2$=$CFO(CF_2)_n CF_3$ (in which n represents an integer of 0 to 3).

As the PAVEs, there may be mentioned perfluoro (methyl vinyl ether) [PMVE], perfluoro (ethyl vinyl ether) [PEVE], perfluoro (propyl vinyl ether) [PPVE] and perfluoro (butyl vinyl ether), among others. From the crack resistance viewpoint, PMVE, PEVE and PPVE are preferred among them, and PPVE is more preferred.

Preferred as the above-mentioned FEP are those composed of TFE units and HFP units alone or those composed of TFE units, HFP units and PFVE units alone. From the viewpoint of avoiding molding defects, those composed of TFE units, HFP units and PFVE units alone are more preferred.

In cases where the above-mentioned FEP contains PFVE units, it may contain units derived from only one PFVE or units derived from two or more PAVEs.

The TFE unit, HFP unit and PFVE unit are respectively derived from TFE, HFP and PFVE and each constitutes a part of the molecular structure of the FEP. For example, the TFE unit is represented by —$(CF_2CF_2)$—.

The above-mentioned FEP preferably has TFE units:HFP units mass ratio (the sum of both monomers being 100) of (70-95):(5-30), more preferably (85-95):(5-15).

When the FEP is a product obtained by copolymerization of some other monomer(s), the total other monomer-derived monomer unit content is generally not higher than 10% by mass of all monomer units.

In cases where the above FEP is composed of TFE units, HFP units and PFVE units alone, the TFE unit:HFP unit: PFVE unit mass ratio (the sum of all units being 100) is preferably (70-95):(4-20):(0.1-10), more preferably (80-95):(4.7-17):(0.3-3).

When the PFVE units includes two PFVE unit species, for example PMVE units and PPVE units, the PFVE unit content in the above mass ratio is based on the total mass of the two unit species.

In the present description, the above mass ratio is the value obtained by measuring the TFE unit, HFP unit and PFVE unit contents using an infrared absorption spectrometer (Perkin Elmer model 1760).

The FEP to be used in the practice of the invention generally has a melting point of not lower than 240° C. and not higher than 280° C. When the melting point is lower than 240° C., the thermal resistance, in particular the thermal resistance of covered electric wire moldings, may become insufficient and, when it is above 280° C., the covering extrusion molding tends to become difficult. A preferred lower limit to the melting point mentioned above is 250° C., a more preferred lower limit thereto is 255° C., a preferred upper limit thereto is 270° C., and a more preferred upper limit thereto is 265° C.

In the present description, the above melting point is the endothermic reaction peak temperature in the thermal melting curve obtained upon measurement using a differential scanning calorimeter (DSC) (product of Seiko) at a programming rate of 10° C./minute.

The above-mentioned FEP preferably has a melt flow rate [MFR] of 10 to 60 (g/10 minutes).

When the FEP has an MFR within the above range, the molding speed in covering molding can be improved and products electrically showing no great variations in capacitance can be obtained from the resulting composition.

From the viewpoint of improving the molding speed, a more preferred lower limit to the above-mentioned MFR is 34 (g/10 minutes), and a more preferred upper limit thereto is 45 (g/10 minutes).

In the present description, the above-mentioned MFR is the value obtained by measurement using a melt index tester according to ASTM D 1238-98 or JIS K 7210, with a sample to be measured weighing about 6 g, at a temperature of 372° C. under a load of 5 kg.

The above-mentioned FEP can be prepared by carrying out the polymerization reaction using TFE and HFP, if desired together with some monomer or monomers other than TFE and HFP, followed by after treatment, such as concentration, according to need.

As the above polymerization reaction, there may be mentioned emulsion polymerization and other methods known in the art.

The fluororesin composition according to the invention further comprises PTFE in addition to the above-mentioned FEP.

In the practice of the invention, the PTFE may be a tetrafluoroethylene [TFE] homopolymer or a modified polytetrafluoroethylene [modified PTFE] as obtained from TFE and a minute-amount comonomer.

The above-mentioned TFE homopolymer is obtained by polymerizing tetrafluoroethylene [TFE] as a single monomer.

The minute-amount comonomer in the above-mentioned modified PTFE is not particularly restricted but may be any of fluorine-containing compounds copolymerizable with TFE, for example perfluoroolefins such as hexafluoropropene [HFP]; perfluoro vinyl ethers [PFVEs] such as the various PAVEs mentioned above; fluorodioxoles; trifluoroethylene; and vinylidene fluoride.

In the above-mentioned modified PTFE, the proportion of the minute-amount comonomer-derived minute-amount comonomer units relative to all the monomer units is generally within the range of 0.001 to 1.0% by mass.

In the present description, the "proportion (% by mass) of the minute-amount comonomer units relative to all the monomer units" means the percentage by mass (% by mass) of the minute-amount comonomer, from the molecules of which the above-mentioned minute-amount comonomer units are derived, relative to the monomers, from the molecules of which the above-mentioned "all the monomer units" are derived, namely the total amount of the monomers now constituting the modified PTFE.

From the thermal resistance and electrical characteristics points of view, the above-mentioned PTFE should have a standard specific gravity [SSG] of 2.15 to 2.30. The above-mentioned SSG is preferably not higher than 2.25, more preferably not higher than 2.22.

When the PTFE is low in SSG, the effect of preventing molding defects can be produced at low addition levels. High-molecular-weight PTFE having a low SSG than 2.25 are not excluded from the use to produce the effect of the invention but are difficult to produce, hence are not practical. When the SSG is high, it becomes possible to produce the above effect by increasing the addition level.

The above-mentioned SSG is the value measured by the water displacement method according to ASTM D 4895-89.

The above-mentioned PTFE can be polymerized by emulsion polymerization or other conventional methods known in the art.

In cases where PTFE agglomerates are present in the fluororesin composition according to the invention, spark out occurs frequently in the step of electric wire covering molding, resulting in an increase in percent defective. Therefore, the PTFE preferably has an average primary particle diameter of 50 to 800 nm; more preferably 50 to 500 nm.

The above-mentioned average primary particle diameter of PTFE is the value determined by measuring the transmittance, per unit length, of projected light at the wavelength of 500 nm through a polymer latex diluted with water to a solid content of 0.22% by mass and comparing the measurement result with a working curve showing the relation between the PTFE number-based length average primary particle diameter and the above transmittance as obtained in advance by measurements of diameters in a certain direction on transmission electron photomicrographs.

In the above-mentioned fluororesin composition, the above-mentioned PTFE content is 0.01 to 3 parts by mass per 100 parts by mass of the FEP.

When it is below 0.01 part by mass, the effect of inhibiting molding defects owing to the addition of PTFE may not be produced; when it is above 3 parts by mass, a problem arises, namely covering breakage due to insufficient dispersion of PTFE occurs frequently in the step of electric wire covering molding.

A preferred lower limit to the above PTFE content is 0.03 part by mass, a preferred upper limit thereto is 2 parts by mass and a more preferred upper limit thereto is 1 part by mass, per 100 parts by mass of FEP.

The fluororesin composition according to the invention preferably has an alkali metal content of lower than 5 ppm on the resin composition solid matter basis.

When that content is 5 ppm or higher on the resin composition solid matter basis, discoloration and/or molding defects due to decomposition of the fluororesin composition may possibly occur on the occasion of molding at high temperatures.

A preferred upper limit to the above content is 3 ppm, a more preferred upper limit thereto is 1 ppm, on the resin composition solid matter basis.

In the present description, the above-mentioned alkali metal content is the value measured by the ashing method. For determining the above content except for the potassium element content, the ashing method was carried out under the following conditions: 2 g of a 0.2% (by mass) aqueous solution of potassium sulfate and about 2 g of methanol were added to 2 g of the sample, the mixture was heated at 580° C. for 30 minutes to burn down the resin, the residue obtained was washed with 20 ml of 0.1 N hydrochloric acid (10 ml×twice) and the 0.1 N hydrochloric acid used for the washing was submitted to measurement on an atomic absorption spectrometer (Hitachi model Z-8100 polarized Zeeman atomic absorption spectrophotometer). The potassium element content determination was carried out under the same conditions as mentioned above except that a 0.2% (by mass) aqueous solution of sodium sulfate was used in lieu of the 0.2% (by mass) aqueous solution of potassium sulfate.

The fluororesin composition according to the invention may further comprise, in addition to the above-mentioned FEP and PTFE, one or more of fillers, stabilizers and other additives known in the art each in an appropriate amount provided that the alkali metal content remains within the range mentioned above.

The fluororesin composition according to the invention preferably has an MFR of 10 to 60 g/10 minutes.

When it has an MFR within such a range, the above fluororesin composition can give covered electric wires with minor fluctuations in diameter of wire even when high-speed electric wire covering is carried out. Thin electric wires can also be covered by molding.

The MFR of the fluororesin composition according to the invention is more preferably not lower than 34 g/10 minutes and more preferably not higher than 45 g/10 minutes.

The fluororesin in the fluororesin composition of the invention is preferably one that is free of or has a low content of thermally unstable terminal groups such as —COOH, —CH$_2$OH, —COF and —CONH$_2$ (such terminal groups are hereinafter referred to as "unstable terminal groups").

The number of unstable terminal groups is preferably not larger than 50 per $1 \times 10^6$ carbon atoms. When it is in excess of 50, molding defects may possibly be caused. The above-mentioned number of unstable terminal groups is more preferably not larger than 20, still more preferably not larger than 10. In the present description, such number of unstable terminal groups is the value obtained by infrared absorption spectrometry.

The above-mentioned number of unstable terminal groups can be reduced by such stabilization treatment as fluorination treatment, as mentioned later herein.

The fluororesin composition according to the invention is obtained by the method comprising the step (1) of obtaining a cocoagulated fluororesin powder by mixing an aqueous dispersion containing the FEP and an aqueous dispersion containing the PTFE together, followed by coagulation, the step (2) of melt extruding the cocoagulated powder and the step (3) of subjecting the extrusion product to treatment for stabilizing unstable terminal groups in the PTFE and FEP.

The above-mentioned step (1) is the step of mixing an aqueous dispersion containing the FEP and an aqueous dispersion containing the PTFE together, followed by coagulation.

The polymer solid concentration in each of the above-mentioned aqueous polymer dispersions is not particularly restricted but can be properly selected according to the kind and amount of each polymer to be used. Preferably, it is 1 to 70% by mass, more preferably 3 to 50% by mass.

The aqueous medium constituting each of the above-mentioned aqueous polymer dispersions may be any water-containing one; thus, it may contain a water-soluble organic solvent such as a water-soluble alcohol, or may not contain such water-soluble organic solvent.

For improved dispersibility, each of the above-mentioned aqueous polymer dispersion preferably contains one or more of those conventional surfactants or the like known in the art at a level within the range which the moldability of the resin obtained will not be impaired.

The cocoagulation can be effected by any appropriate conventional method provided that the mixing ratio becomes such that the PTFE amounts to 0.01 to 3 parts by mass per 100 parts by mass of the FEP.

In the above cocoagulation step, the mixture obtained by mixing up the two aqueous polymer dispersions is preferably adjusted to a total polymer solid concentration of 5 to 40% by mass.

The method of coagulation in the above cocoagulation step is not particularly restricted but there may be mentioned, for example, the coagulation method using nitric acid, hydrochloric acid or the like as a coagulating agent. Mention may also be made of the technique which uses mechanical means such as stirring, without using any coagulating agent.

The wet powder recovered after the above-mentioned cocoagulation is preferably dried. The drying is preferably carried out at a temperature of 100 to 240° C. for 2 to 48 hours. On that occasion, such means for promoting drying as reductions in pressure and/or passage of a dry gas can also be taken.

The above-mentioned step (2) is the step of melt extruding the cocoagulated powder obtained in the above step (1).

The above step (2) can be carried out under extrusion conditions appropriately selected from among the extrusion conditions under which pelletization is generally possible.

In the above step (2), the pelletization can be carried out using a two-screw extruder, for instance. In carrying out such pelletization, the cylinder temperature is preferably set at 280 to 430° C.

The fluororesin composition according to the invention is obtained after carrying out the step (3) in which unstable terminal groups in the above-mentioned PTFE and FEP are subjected to stabilization treatment, in addition to the above-mentioned steps (1) and (2). As such stabilization treatment, there may be mentioned, for example, the method which comprises bringing the above cocoagulated powder prior to melt extrusion into contact with a fluorine-containing compound for stabilization treatment and the method which comprises bringing the fluororesin pellets obtained by the above-mentioned melt extrusion into contact with a fluorine-containing compound for stabilization treatment.

As the stabilization treatment, there may be mentioned the fluorination treatment which comprises bringing the fluororesin into contact with a fluorine-containing compound. As such stabilization treatment, there may be mentioned, for example, the treatment comprising bringing the pellets obtained from the step (2) into contact with a fluorine-containing compound.

The above step (3) preferably comprises bringing the PTFE and FEP into contact with fluorine gas.

The fluorine-containing compound mentioned above is not particularly restricted but includes fluorine radical sources generating fluorine radicals under fluorination treatment conditions. As the fluorine radical sources, there may be mentioned $F_2$ gas, $CoF_3$, $AgF_2$, $UF_6$, $OF_2$, $N_2F_2$, $CF_3OF$ and halogen fluorides (e.g. $IF_5$, $ClF_3$), among others.

The above-mentioned $F_2$ gas may be one having a concentration of 100% but, from the safety viewpoint, $F_2$ gas is preferably used in a form diluted to 5 to 50% by mass, more preferably 15 to 30% by mass, by mixing with an inert gas. As the inert gas, there may be mentioned nitrogen gas, helium gas and argon gas, for instance; from the economical viewpoint, nitrogen gas is preferred, however.

The fluorination treatment conditions are not particularly restricted but, generally, the treatment can be carried out at a temperature of not higher than the melting point of the fluororesin composition, preferably 20 to 220° C., more preferably 100 to 200° C. Such fluorination treatment is generally carried out for 5 to 30 hours, preferably 10 to 20 hours.

The fluororesin composition according to the invention preferably has a melt tension of 0.08 to 0.16 N.

When the above fluororesin composition has a melt tension within the above specific range, minute resin lumps, even when formed at the extrusion opening during electric wire covering extrusion molding, can be inhibited from growing up to form lumps of a significant size.

A more preferred lower limit to the above melt tension is 0.1 N.

The melt tension mentioned above is the value obtained by measuring the melt tension of a strand obtained by using a capillograph (Rosand capillary rheometer), feeding about 50 g of the resin into a cylinder with an inside diameter of 15 mm at about 385° C. and extruding the resin through an orifice with an inside diameter of 2 mm and a length of 20 mm under a shear rate of 36.5 (1/s).

The fluororesin composition according to the invention has good moldability and hardly causes molding defects and, in addition, has good thermal resistance, chemical resistance, solvent resistance, insulating properties and electrical characteristics, among others, and therefore can be submitted to the manufacture of various moldings such as covering materials for electric wires, foamed electric wires, cables and wires, tubes, films, sheets, filaments and so forth. It can be suitably used in electric wire covering extrusion molding, among others.

The fluororesin composition according to the invention makes it possible to markedly reduce the incidence of molding defects which have so far produced problems, such as covering breakage, spark out, lump formation and fluctuations in capacitance, without lowering the covering molding speed in the electric wire covering extrusion molding.

When the above-mentioned fluororesin composition is used in extrusion molding of foamed electric wires, in particular, uniform foaming (porosity) can be attained and, therefore, electric wires showing good capacitance stability and a very good surface condition can be obtained. Further, the composition is excellent in molding stability at high speed and can provide thinner foamed electric wires. This is presumably because the improvement in tension makes foam breaking difficult to occur and makes resin starvation difficult to occur.

A covered electric wire comprising a core conductor and a covering made of the fluororesin composition according to the invention on the core conductor also constitutes an aspect of the present invention.

The covered electric wire according to the invention is not particularly restricted provided that it comprises a core conductor and the above-mentioned covering; thus, for example, cables and wires may be mentioned.

The above-mentioned covered electric wire is especially suited for use as an insulated wire for communication, for example a data communication cable such as a LAN cable or a cable for connecting a computer to a peripheral unit; it is also suited for use as a plenum cable for wiring in an attic space (plenum area) in a building, for example.

As the covered wire according to the invention, there may also be mentioned coaxial cables, high-frequency cables, flat cables, heat-proof cables and so forth.

The core conductor material in the covered electric wire according to the invention is not particularly restricted but such metal conductor materials as copper and silver can be used.

The covered electric wire according to the invention preferably has a core conductor size of 2 to 80 mils in diameter.

The covering in the above-mentioned covered electric wire is not particularly restricted provided that it is based on the fluororesin composition according to the invention. In particular, the FEP in the fluororesin composition according to the invention is preferably a perfluoropolymer, more preferably one composed of TFE units, HFP units and PFVE units, still more preferably one composed of TFE units, HFP units and PFVE units and having a melting point of not lower than 240° C. and not higher than 280° C.

The above-mentioned covered electric wire preferably has a covering thickness of 1.0 to 20 mils.

The covered electric wire of the invention may be one comprising a further layer formed around the covering mentioned above or one the core conductor of which is covered with another layer around which the above-mentioned covering is further formed.

The other layer mentioned above is not particularly restricted but may be a resin layer made of such a resin as a TFE/PAVE copolymer, a TFE/ethylene-based copolymer, a vinylidene fluoride-based polymer, a polyolefin resin such as polyethylene [PE], or polyvinyl chloride [PVC]. From the cost viewpoint, PE and PVC are preferred.

The thickness of the above other layer is not particularly restricted but may be 1 mil to 20 mils.

A foamed electric wire comprising a core conductor and a covering made of the fluororesin composition according to the invention on the core conductor also constituted an aspect of the present invention.

The covering of the foamed electric wire according to the invention is made of the above-mentioned fluororesin composition and this covering layer is uniform in degree of foaming and is excellent in surface condition (surface smoothness). Further, the composition is excellent in high-speed molding stability and can give thinner foamed electric wires.

The core conductor, covering layer thickness and optional other layer in the foamed electric wire mentioned above are the same as the above-mentioned covered electric wire.

The above foamed electric wire may have a two-layer covering structure with an unfoamed layer inserted between the core conductor and foamed covering layer (skin-foam structure), a two-layer covering structure with an unfoamed layer formed as an outside layer (foam-skin structure), or a three-layer covering structure with a skin-foam structure further covered with an unfoamed layer as an outside layer (skin-foam-skin structure).

The unfoamed layer of the above-mentioned foamed electric wire is not particularly restricted but may be a resin layer made of such a resin as a TFE/PAVE copolymer, a TFE/ethylene-based copolymer, a vinylidene fluoride-based polymer, a polyolefin resin such as polyethylene [PE], or polyvinyl chloride. From the interlaminar bonding viewpoint, the above-mentioned unfoamed layer is preferably made of FEP.

The above-mentioned foamed electric wire can be produced in the same manner as in the conventional art except that the core conductor is covered with the above-mentioned fluororesin composition. Preferred extrusion molding conditions can be properly selected according to the composition of the resin composition to be used and the core conductor size.

The nucleating agent for foaming to be used in the production of the above-mentioned foamed electric wire is not particularly restricted but there may be mentioned, for example, graphite, carbon fibers, silica, alumina, titanium oxide, zinc oxide, magnesium oxide, tin oxide, zinc oxide, antimony oxide, calcium carbonate, magnesium carbonate, glass, talc, mica, isinglass, boron nitride (BN), aluminum nitride, calcium phosphate and the like.

Effects of the Invention

The fluororesin composition according to the invention, which has the constitution described hereinabove, is excellent in extrusion moldability and enables high-speed extrusion covering.

The covered electric wire and foamed electric wire according to the invention, the coverings of which are made of the above-mentioned fluororesin composition, scarcely have molding defects, are excellent in surface smoothness and have good electrical characteristics.

BEST MODES FOR CARRYING OUT THE INVENTION

The following examples, including comparative examples, illustrate the invention in further detail. These examples and comparative examples are, however, by no means limitative of the scope of the invention.

Unless otherwise specified, "part (s)" means "part (s) by mass".

PRODUCTION EXAMPLE 1

PTFE Homopolymer Dispersion

A 100-liter stainless steel autoclave equipped with an anchor impeller and a jacket for temperature adjustment was charged with 49 L of deionized water, 1.4 kg of a solid paraffin wax having a melting point of 62° C. and 73 g of ammonium perfluorooctanoate [PFOA] and, with heating at 85° C., the system inside was deprived of oxygen by purging with three portions of nitrogen gas and two portions of tetrafluoroethylene [TFE] gas and, then, TFE was fed into the autoclave under pressure until arrival of the internal pressure at 6.5 kg/cm$^2$G. Then, an aqueous solution of ammonium persulfate [APS] as prepared by dissolving 313 mg of APS in 330 ml of water and an aqueous solution of disuccinoyl peroxide [DSP] as prepared by dissolving 5 g of DSP in 330 ml of water were fed into the autoclave together with TFE under pressure to raise the autoclave inside pressure to 8.0 kg/cm$^2$G. While the reaction progressed in an accelerated manner, TFE gas was fed continuously so as to maintain the reaction temperature at 85° C. and the autoclave inside pressure at 8.0 kg/cm$^2$G.

At the point of time of arrival of the amount of TFE consumed by the reaction at 23.8 kg after addition of the aqueous solution of APS, the feeding of TFE and the stirring were discontinued and the autoclave inside gas was immediately discharged until arrival at ordinary pressure, and the contents (latex) were taken out. The polymer had an average primary particle diameter of 300 nm.

A portion of the latex obtained was evaporated to dryness at 200° C. over 1 hour, and the polymer concentration was calculated based on the solid matter obtained and was found to be 32.5% by mass. The polymer had a standard specific gravity of 2.173.

PRODUCTION EXAMPLE 2

Modified PTFE Dispersion

The same apparatus as used in Production Example 1 was charged with 49 L of deionized water, 1.6 kg of a solid paraffin wax having a melting point of 56° C. and 50 g of PFOA and, with heating at 70° C., the system inside was deprived of oxygen by purging with three portions of nitrogen gas and two portions of TFE gas and, then, TFE was fed into the autoclave under pressure until arrival of the internal pressure at 7.0 kg/cm$^2$G. Then, 5 g of perfluoro(propyl vinyl ether) [PPVE] and, further, an aqueous solution of APS as prepared by dissolving 187 mg of APS in 330 ml of water and an aqueous solution of DSP as prepared by dissolving 6 g of DSP in 330 ml of water were fed into the autoclave together with TFE under pressure to raise the autoclave inside pressure to 8.0 kg/cm²G. While the reaction progressed in an accelerated manner, the reaction temperature was maintained at 70° C. and the rate of stirring at 280 rpm. TFE was fed continuously to always maintain the autoclave inside pressure at 8.0 kg/cm²G.

At the point of time of arrival of the amount of TFE consumed by the reaction at 21.7 kg after addition of the aqueous solution of APS, the feeding of TFE and the stirring were discontinued and the autoclave inside gas was immediately discharged until arrival of the inside pressure at 2.0 kg/cm²G, a monomer mixture prepared in advance and composed of chlorotrifluoroethylene [CTFE] and TFE (CTFE content 1.5 mole percent) was then fed, and the reaction was continued at an internal pressure of 8.0 kg/cm2G and a rate of stirring of 280 rpm. At the point of time of arrival of the consumption of the monomer mixture at 2.1 kg, the feeding of the monomer mixture and the stirring were discontinued and the autoclave inside gas was immediately discharged until arrival at ordinary pressure, and the contents (latex) were taken out. The polymer had an average primary particle diameter of 295 nm.

A portion of the latex obtained was evaporated to dryness at 200° C. over 1 hour, and the polymer concentration was calculated based on the solid matter obtained and was found to be 31.9% by mass. The polymer had a standard specific gravity of 2.171.

The polymer obtained had a PPVE content of 0.02% by mass and a CTFE content of 0.09% by mass.

PRODUCTION EXAMPLE 3

A horizontal stainless steel autoclave (capacity 1000 L) equipped with a stirrer was deaerated in advance and charged with 600 L of deionized water and 60 kg of a 10% (by mass) aqueous solution of a fluorinated surfactant ($C_7F_{15}COONH_4$), followed by three repetitions of a nitrogen substitution and evacuation procedure. Then, the autoclave was charged with 100 kg of HFP monomer and further with a monomer mixture composed of TFE and HFP (TFE:HFP=86:14 (% by mass)) and, with stirring at a rate of stirring of 200 rpm, the temperature was raised gradually until arrival of the autoclave inside atmosphere temperature at 95° C. and the pressure was raised to 1.5 MPaG. The reaction was initiated by feeding 70 kg of a 10% (by mass) aqueous solution of APS as a polymerization initiator. The monomer mixture mentioned above was continuously fed to maintain the reaction system inside pressure at 1.5 MPaG. After 30 minutes from the start of the polymerization, the stirring was discontinued, and the autoclave inside gas was discharged until arrival at ordinary pressure, whereby the polymerization reaction was terminated; a TFE/HFP binary polymer emulsion/dispersion with a polymer solid concentration of 4.5% by mass was obtained.

Separately, the same stainless steel autoclave as used above was deaerated in advance and charged with 600 L of deionized water and 20 kg of the above-mentioned binary polymer emulsion/dispersion, followed by three repetitions of a nitrogen substitution and evacuation procedure. Thereafter, the autoclave was charged with 138 kg of HFP monomer and then with 4 kg of PPVE and, with stirring at a rate of stirring of 200 rpm, the temperature was raised gradually until arrival of the autoclave inside atmosphere temperature at 95° C. and the pressure was raised to 4.2 MPaG by feeding a monomer mixture composed of TFE and HEP (TFE:HFP=87.3:12.7 (% by mass)) under pressure. The polymerization reaction was initiated by feeding 2.8 kg of a 10% (by mass) aqueous solution of APS as a polymerization initiator. After initiation of the reaction, a 10% (by mass) aqueous solution of APS was continuously fed at a rate of 22 g/minute. During the reaction, when the amount of the above monomer mixture arrived at 25% by mass, 50% by mass and 75% by mass of the total amount of the monomers fed, 180 g of PPVE was fed each time. The above monomer mixture was fed continuously to maintain the system inside pressure at 4.2 MPaG. After 51 minutes from the start of the polymerization, the feeding of the 10% (by mass) aqueous solution of APS was terminated, the stirring was discontinued and the autoclave inside gas was discharged until arrival at ordinary pressure, whereby the polymerization reaction was terminated.

A portion of the TFE/HFP/PPVE terpolymer emulsion/dispersion (latex) obtained was evaporated to dryness at 200° C. over 1 hour, and the polymer concentration was calculated based on the solid matter obtained and was found to be 20.2% by mass.

The polymer obtained had a MFR of 35.7 g/10 minutes, a composition ratio (% by mass) of TFE/HFP/PPVE=87.6/11.5/0.9, and a melting point of 257° C.

The data for the polymers obtained in the Production Examples were obtained by the methods described below.

1. Melt Flow Rate [MFR]

The MFR was determined according to ASTM D 1238-98 using a melt index tester (product of Toyo Seiki Seisakusho). Thus, about 6 g of the resin was fed into a cylinder maintained at 372° C., allowed to stand there for 5 minutes for temperature equilibration and then extruded through an orifice with a diameter of 2 mm and a length of 8 mm under a piston load of 5 kg, and the mass (g) of the resin collected per unit time (generally 10 to 60 seconds). Three measurements were carried out with the same sample, and the mean of the three values was expressed in terms of the amount extruded per 10 minutes (i.e. in g/10 minutes) was reported as the measured value.

2. Standard Specific Gravity [SSG]

The SSG was measured by the water replacement method according to ASTM D 4895-89.

3. Melting Point

A differential scanning calorimeter [DSC] (product of Seiko) was used. The temperature was raised at a programming rate of 10° C./minute, the melting peak was recorded and the temperature corresponding to the maximum value was reported as the melting point.

4. 1% (By Weight) Thermal Decomposition Temperature

A thermogravimetric analyzer [TGA] (product of Shimadzu) was used. The temperature was raised at a programming rate of 10° C./minute, the losses in weight were recorded and the temperature at which the weight loss amounted to 1% by weight was reported as the 1% (by weight) thermal decomposition temperature.

5. Composition

The composition was determined using an infrared absorption spectrometer (Perkin Elmer model 1760).

The CTFE content was defined as the percentage by mass value in the polymer as obtained by multiplying the ratio of the absorbance at 2360 $cm^{-1}$ to the absorbance at 957 $cm^{-1}$ in the infrared absorption spectrum bands by 0.58, and the PPVE content was defined as the percentage by mass value in the polymer as obtained by multiplying the ratio of the absorbance at 2360 $cm^{-1}$ to the absorbance at 995 $cm^{-1}$ in the infrared absorption spectrum bands by 0.95.

6. Average Primary Particle Diameter

The average primary particle diameter was determined by measuring the transmittance, per unit length, of projected light at the wavelength of 500 nm through a polymer latex diluted with water to a solid content of 0.22% by mass and comparing the measurement result with a working curve showing the relation between the PTFE number-based length average primary particle diameter and the above transmittance as obtained in advance by measurements of diameters in a certain direction on transmission electron photomicrographs.

7. Determination of Numbers of Terminal Groups

The assays and analyses were carried out using an infrared absorption spectrometer (Perkin Elmer model 1760) and Perkin Elmer Spectrum for Windows (registered trademark) version: 1.4C.

The resin is compression-molded at a temperature of 300° C. to give a film having a thickness of 250 to 300 μm. The infrared absorption spectrum of this film is measured and the terminal group species are determined by comparison of the spectrum with the infrared spectrum of a sample containing none of the terminal groups occurring in that film, and the numbers of respective terminal groups are calculated from the difference spectrum between both the spectra using the following equation.

Number of terminal groups(per $10^6$ carbon atoms)=$l \cdot k/t$ l: absorbance
k: correction factor
t: film thickness (mm)

The correction factors for the intended terminal group species are shown below. These correction factors are determined from the infrared absorption spectra of model compounds for calculating the numbers of the respective terminal groups per $10^6$ carbon atoms. The infrared absorption spectra are measured by scanning 32 times using an infrared absorption spectrometer (Perkin Elmer model 1760).

TABLE 1

| Terminal group | Absorption wave number ($cm^{-1}$) | Correction factor |
|---|---|---|
| COF | 1883 | 388 |
| COOH(free) | 1815 | 440 |
| COOH(bonded) | 1775 | 440 |
| $CONH_2$ | 3438 | 480 |
| $CH_2OH$ | 3648 | 2300 |

EXAMPLE 1

The TFE/HFP/PPVE terpolymer emulsion/dispersion (hereinafter this emulsion/dispersion is sometimes referred to as "FEP dispersion") obtained in Production Example 3 was transferred to a 3000-L autoclave equipped with a stirrer, and the polymer solid matter concentration was adjusted to 10% by mass by adding deionized water with stirring. Then, the PTFE dispersion obtained in Production Example 1 was added thereto with stirring in an amount of 0.07 part per 100 parts of the above-mentioned TFE/HFP/PPVE terpolymer on the solid matter basis. Then, 40 kg of 60% nitric acid was added to the mixture, coagulation was allowed to occur at a rate of stirring of 40 rpm and, after separation into a solid phase and a liquid phase, the aqueous phase was removed. The solid was washed with deionized water and the thus-obtained white powder was deprived of water in a convection air oven at 170° C. for 20 hours to give a perfluoropolymer (A) as a white powder.

Then, this white perfluoropolymer (A) powder was melt-pelletized on a twin-screw extruder (product of Japan Steel Works). This extruder has a screw diameter of 32 mm with L/D=52.5 and is constituted of a feeding zone, plasticizing zone, vent zone and metering zone in that order from the raw material feeding side. Resin pellets were obtained by feeding the raw material to the extruder at a screw revolution speed of 200 rpm and a rate of feeding of 15 kg/hour. The pellets were further brought into contact with nitrogen gas-diluted 25% (by volume) fluorine gas at a temperature of 200° C. for 18 hours, whereby a fluororesin composition was obtained.

Further, the fluororesin composition obtained was subjected to melting point, 1% (by weight) thermal decomposition temperature and MFR measurements by the methods respectively mentioned above and, further, subjected to the following measurement.

(Melt Tension)

A capillograph (product of Rosand) was used. About 50 g of the resin was fed to a cylinder having an inside diameter of 15 mm and maintained at 385±0.5° C., allowed to stand there for 10 minutes for making the temperature of the fluororesin composition uniform and then extruded through an orifice with an inside diameter of 2 mm (error not exceeding 0.002 mm) and a length of 20 mm at a shear rate of 36.5 (1/s) to give a strand.

Further, the above strand was passed through a pulley positioned just below the orifice opening at a distance of 45 cm, pulled up obliquely upward at an angle of 60° and wound around a roll disposed almost at the same height with the orifice opening. The maximum value among the tension values measured under conditions such that the roll take-off speed was raised from 5 m/minute to 500 m/minute over 5 minutes was reported as the melt tension.

Then, using the above-obtained fluororesin composition as the covering, electric wire covering was conducted and the molding behavior was evaluated on-line during the electric wire covering extrusion molding in the following manner.

The electric wire covering molding conditions were as follows.

(1) Core conductor: annealed copper wire AWG (American Wire Gauge) 24, core conductor diameter 20.1 mils
(2) Covering thickness: 7.2 mils
(3) Covered electric wire diameter: 34.5 mils
(4) Wire take-off speed: 2000 feet/minute
(5) Melt molding (extrusion) conditions:
  Cylinder screw diameter=2 inches
  Single-screw extrusion molding machine with L/D=30
  Die (inside diameter)/tip (outside diameter)=0.345 inch/0.187 inch
  Preset temperatures in extruder: barrel zone Z1 (340° C.), barrel zone Z2 (360° C.), barrel zone Z3 (370° C.), barrel zone Z4 (385° C.), barrel zone Z5 (390° C.), clamp zone (400° C.), adaptor zone (410° C.), crosshead zone (415° C.), die zone (415° C.); the core conductor preheating temperature was preset at 140° C.
  Molten melt cone length in molding=3.7 to 4.0 mm 1. Spark Out Measurement After cooling in an air cooling zone and water cooling zone, about 10 m in length, the number of sites not covered with the resin were determined as the frequency of occurrence of sparks during 3 hours of molding at a measurement voltage of 2.5 kV using a spark detector (model HF-20-H, product of Clinton Instrument Company).

2. Lump Size (Height) and Occurrence Frequency Measurements

Using a lump detector, KW32TR10 (product of Zumbach), the frequency of occurrence of lumps with a size not smaller than 10 mils as formed during 3 hours of molding was measured.

3. Wire Diameter Fluctuation Measurement

Using an outside diameter measuring instrument, ODAC 15XY (product of Zumbach), outside diameter (OD) measurements were carried out for 3 hours, and the fluctuation was calculated in terms of process capacity index [Cp]. The upper wire diameter limit (USL) was preset at the above-mentioned covered electric wire diameter 34.5 mils plus 0.5 mil and the lower limit (LSL) at the above-mentioned covered electric wire diameter minus 0.5 mil using USYS 2000 (product of Zumbach), and the Cp was analyzed from the outside diameter data obtained.

4. Capacitance Fluctuation Measurement

Using a capacitance measuring instrument, CAPAC HS (type: MR20.50HS, product of Zumbach), measurements were carried out for 3 hours, and the fluctuation was calculated in terms of process capacity index [Cp]. The Cp was analyzed by storing data successively in USYS 2000 (product of Zumbach), presetting the upper limit (USL) at +1.0 (pf/inch) and the lower limit (LSL) at −1.0 (pf/inch).

5. Extent of Die-drool

The extent was judged by visual observation during 3 hours of molding. The evaluation criteria were as follows.

| | |
|---|---|
| Very little | No or substantially unconfirmable die-drool |
| Occasional | Die-drool sometimes confirmable |
| Frequent | Die-drool frequently confirmable |

EXAMPLE 2

The procedure of Example 1 was followed in the same manner except that the PTFE dispersion was added in an amount, on the solid matter basis, of 0.15 part per 100 parts of the TFE/HFP/PPVE terpolymer. The fluororesin composition thus obtained was subjected to electric wire covering molding evaluation.

EXAMPLE 3

The procedure of Example 1 was followed in the same manner except that the FEP dispersion used was one with a MFR of 43 g/10 minutes. The fluororesin composition thus obtained was subjected to electric wire covering molding evaluation.

EXAMPLE 4

The procedure of Example 1 was followed in the same manner except that the PTFE dispersion used was that obtained in Production Example 2. The fluororesin composition thus obtained was subjected to electric wire covering molding evaluation.

COMPARATIVE EXAMPLE 1

The procedure of Example 1 was followed in the same manner except that the addition of the PTFE dispersion was omitted.

The fluororesin composition thus obtained was subjected to electric wire covering molding evaluation.

COMPARATIVE EXAMPLE 2

The PTFE dispersion obtained in Production Example 1 was transferred to a stainless steel coagulation vessel equipped with an anchor impeller and a baffle plate, water was added to lower the specific gravity of the PTFE dispersion to 1.075, the temperature was adjusted to 20° C. and, immediately thereafter, 60% nitric acid was added and, at the same time, the mixture was stirred for coagulating the polymer. The polymer was separated from the water by filtration, again placed in water by addition thereof for washing and for simultaneous particle size adjustment, then separated from the water by filtration and dried at 140° C. for 24 hours to give a PTFE fine powder.

The PTFE fine powder obtained had an apparent density of 0.44 g/ml and had an average secondary particle diameter of 475 μm.

Separately, a perfluoropolymer (B) white powder (TFE/HFP/PPVE terpolymer) was obtained in the same manner as in Example 1 except that the addition of the PTFE dispersion was omitted.

Then, a powder mixer equipped with a stirrer and a kneading block was charged with the perfluoropolymer (B) white powder and the above-mentioned PTFE fine powder in an amount, on the solid matter basis, of 0.07 part per 100 parts of the former and, after 30 minutes of preliminary mixing, the mixture was pelletized in the same manner as in Example 1. The fluororesin composition thus obtained was subjected to electric wire covering molding evaluation.

COMPARATIVE EXAMPLE 3

The procedure of Example 1 was followed in the same manner except that the fluorination treatment was omitted and that $Na_2CO_3$ was added to a final concentration of 30 ppm and wet heat treatment was carried out by the same method as described in International Publication WO 2006/123694. The fluororesin composition thus obtained was subjected to electric wire covering molding evaluation.

EXAMPLE 5

The procedure of Example 1 was followed in the same manner except that, after melt pelletization, the pellets were brought into contact with 25% (by volume) fluorine gas diluted with nitrogen gas at a temperature of 200° C. for 3 hours. The fluororesin composition thus obtained was subjected to electric wire covering molding evaluation.

The results obtained in each example and in each comparative example are shown in Table 2.

TABLE 2

| | | Example 1 | Example 2 | Example 3 | Example 4 | Comparative Example 1 | Comparative Example 2 | Comparative Example 3 | Example 5 |
|---|---|---|---|---|---|---|---|---|---|
| PTFE incorporated | Species | Production Example 1 | Production Example 1 | Production Example 1 | Production Example 2 | Not added | Powder of Production Example 1 | Production Example 1 | Production Example 1 |
| | Addition level (% by mass, relative to FEP) | 0.07 | 0.15 | 0.07 | 0.07 | | 0.07 | 0.07 | 0.07 |
| | Standard specific gravity (SSG) of PTFE | 2.173 | 2.173 | 2.173 | 2.171 | | 2.173 | 2.173 | 2.173 |
| | PTFE particle diameter (nm) | 300 | 300 | 300 | 295 | | | 300 | 300 |
| Physical properties of fluororesin composition | Melting point (° C.) | 257 | 257 | 257 | 257 | 257 | 257 | 257 | 257 |
| | 1 weight % thermal decomposition temperature (° C.) | 440 | 440 | 440 | 440 | 440 | 440 | 425 | 440 |
| | MFR (g/10 minutes) | 35 | 35 | 43 | 35 | 35 | 35 | 35 | 35 |
| | Melt tension (N) | 0.13 | 0.15 | 0.13 | 0.13 | 0.07 | Unmeasurable due to resin breakage | 0.13 | 0.13 |
| | Number of thermally unstable terminal groups —COOH | 6 | 4 | 7 | 3 | 5 | 5 | Not measured | 18 |
| | —COF | 10 | 10 | 11 | 6 | 11 | 13 | Not measured | 40 |
| | —CH$_2$OH | 0 | 0 | 0 | 0 | 0 | 0 | Not measured | 0 |
| | —CONH$_2$ | 0 | 0 | 0 | 0 | 0 | 0 | Not measured | 0 |
| Electric wire molding evaluation results | Frequency of lump formation (number/3 hours) | 2 | 1 | 1 | 2 | 8 | 10 | 5 | 4 |
| | Die drool occurrence | Very little | Very little | Very little | Very little | Occasional | Frequent | Occasional | Occasional |
| | Wire diameter stability (Cp) | 1.6 | 1.4 | 1.6 | 1.5 | 1.4 | 0.8 | 1.1 | 1.2 |
| | Capacitance stability (Cp) | 1.3 | 1.3 | 1.2 | 1.3 | 1.2 | 0.5 | 0.8 | 1.0 |
| | Spark out frequency (number/3 hours) | 8 | 7 | 6 | 8 | 30 | >100 | 13 | 15 |

From the results of the melting point and 1% (by weight) thermal decomposition temperature, it was revealed that the fluororesin compositions according to the invention were superior in thermal resistance.

For all the electric wires obtained in the Examples 1 to 4, it was found that the lump formation frequency and spark out frequency were low, the die drool occurrence was very little and the wire diameter stability and capacitance stability were good.

EXAMPLE 6

Masterbatch pellets prepared by blending the fluororesin composition obtained in Example 1 with boron nitride (BN, grade SHP-325, average particle diameter 10.3 μm; product of Carborundum Corp.) to a boron nitride concentration of 7.5% by mass and the fluororesin composition pellets obtained in Example 1 were mixed together in a mixing ratio of masterbatch pellets/pellets of Example 1=1:9 and the mixture was used for foamed electric wire molding under the following conditions.

The electric wire covering molding conditions were as follows.
(1) Core conductor: annealed copper wire, core conductor diameter 0.7 mm
(2) Covering thickness: 0.2 mm
(3) Covered electric wire diameter: 1.1 mm
(4) Wire take-off speed: 1000 feet/minute
(5) Nitrogen introduction pressure: 34.0 MPa
(6) Melt molding (extrusion) conditions:
    Cylinder screw diameter=35 mm
    Single-screw extrusion molding machine with L/D=30
    Die (inside diameter)/tip (outside diameter)=4.7 mm/2.2 mm
    Preset temperatures in extruder: barrel zone Z1 (330° C.), barrel zone Z2 (340° C.), barrel zone Z3 (345° C.), barrel zone Z4 (350° C.) barrel zone Z5 (350° C.), clamp zone (340° C.), adaptor zone (340° C.), crosshead zone (335° C.), die zone (330° C.); the core conductor preheating temperature was preset at 140° C.
    Molten melt cone length in molding=2.0 to 2.5 mm The foamed electric wire molding was carried out continuously for 1 hour, and spark out, wire diameter fluctuation, capacitance fluctuation and die-drool occurrence measurements/observations were made in the same manner as shown in Example 1. Further, the foaming rate and average bubble diameter of the foamed electric wire obtained were determined by the methods described below and the surface condition thereof was observed.

1. Foaming Rate

The covering of the foamed electric wire was peeled off from the core conductor over a distance of about 50 cm, the volume thereof was calculated from the outside diameter, inside diameter and length thereof, the mass thereof was measured, and the specific gravity (d: g/cm$^3$) was calculated from the quotient (above mass/above volume).

Using the true specific gravity (2.15 g/cm$^3$) of the unfoamed FEP, the foaming rate was calculated according to the following formula.

$$\text{Foaming rate} = (1 - d/2.15) \times 100 (\%)$$

2. Average Bubble Diameter

SEM images of cross sections of the electric wire were photographed, bubble diameters were measured, and the average bubble diameter was determined in terms of the arithmetic mean thereof.

3. Surface Condition

The surface of the covered electric wire was scanned with a bare hand and evaluated in terms of the incidence of protuberances (projections) as felt by the hand. The evaluation criteria are shown below.

Very good No protuberance
Good A small number of protuberances
Poor A fairly large number of protuberances

EXAMPLE 7

Foamed electric wire molding was carried out following the procedure of Example 6 in the same manner except that the fluororesin composition pellets of Example 3 were used.

COMPARATIVE EXAMPLE 4

Foamed electric wire molding was carried out following the procedure of Example 6 in the same manner except that the fluororesin composition pellets of Comparative Example 1 were used.

COMPARATIVE EXAMPLE 5

Foamed electric wire molding was carried out following the procedure of Example 6 in the same manner except that the fluororesin composition pellets of Comparative Example 3 were used.

EXAMPLE 8

Foamed electric wire molding was carried out following the procedure of Example 6 in the same manner except that the fluororesin composition pellets of Example 5 were used.

The results obtained in the foamed electric wire molding examples and comparative examples are shown in Table 3.

For all the foamed electric wires of Examples 6 and 7, it was revealed that the die-drool occurrence was very little and the wire diameter stability and capacitance stability were good. It was also found that the average bubble diameter was small in spite of the equivalent foaming rate and that the electric wire surface condition was very good.

Industrial Applicability

The fluororesin composition of the invention, which has the constitution mentioned hereinabove, is excellent in extrusion moldability and enables high-speed extrusion covering. It is therefore useful as a covering for covered electric wires, especially foamed electric wires.

The covered electric wire and foamed electric wire according to the invention, the coverings of which are made of the above-mentioned fluororesin composition, scarcely have molding defects and have good electrical characteristics. Among them, the foamed electric wire has a good surface condition (surface smoothness) and is uniform in capacitance and excellent in electrical characteristics.

The invention claimed is:

1. A fluororesin composition comprising a polytetrafluoroethylene [PTFE] having a standard specific gravity of 2.15 to 2.30 and a tetrafluoroethylene/hexafluoropropylene-based copolymer [FEP], the content of said PTFE being 0.01 to 3 parts by mass per 100 parts by mass of said FEP and the alkali metal content being lower than 5 ppm on the resin composition solid matter basis, wherein said composition is obtained by a method comprising the step (1) of obtaining a cocoagulated fluororesin powder by mixing an aqueous dispersion containing said FEP and an aqueous dispersion containing said PTFE together, followed by coagulation, the step (2) of melt extruding the cocoagulated powder and the step (3) of subjecting unstable terminal groups in said

TABLE 3

|  |  | Example 6 | Example 7 | Comparative Example 4 | Comparative Example 5 | Example 8 |
|---|---|---|---|---|---|---|
| PTFE incorporated | Species | Production Example 1 | Production Example 1 | Not added | Production Example 1 | Production Example 1 |
|  | Addition level (% by mass, relative to FEP) | 0.07 | 0.07 |  | 0.10 | 0.07 |
|  | Standard specific gravity (SSG) of PTFE | 2.173 | 2.173 |  | 2.173 | 2.173 |
|  | PTFE particle diameter (nm) | 300 | 300 |  | 300 | 300 |
| Physical properties of fluororesin composition | Melting point (° C.) | 257 | 257 | 257 | 257 | 257 |
|  | 1 weight % thermal decomposition temperature (° C.) | 440 | 440 | 440 | 425 | 440 |
|  | MFR (g/10 minutes) | 35 | 43 | 35 | 35 | 35 |
|  | Melt tension (N) | 0.13 | 0.13 | 0.07 | 0.13 | 0.13 |
|  | Number of thermally unstable terminal groups —COOH | 6 | 7 | 5 | Not measured | 18 |
|  | —COF | 10 | 11 | 11 | Not measured | 40 |
|  | —CH$_2$OH | 0 | 0 | 0 | Not measured | 0 |
|  | —CONH$_2$ | 0 | 0 | 0 | Not measured | 0 |
| Electric wire molding evaluation results | Die drool occurrence | Very little | Very little | Frequent | Occasional | Occasional |
|  | Wire diameter stability (Cp) | 1.3 | 1.4 | 0.8 | 0.9 | 1.1 |
|  | Capacitance stability (Cp) | 1.2 | 1.3 | 0.7 | 0.8 | 1.0 |
|  | Spark out frequency (number/3 hours) | 3 | 4 | 27 | 8 | 7 |
|  | Foaming rate(%) | 25 | 24 | 25 | 25 | 26 |
|  | Average bubble diameter(μm) | 22 | 21 | 31 | 25 | 25 |
|  | Surface condition | Very good | Very good | Poor | Good | Good |

PTFE and FEP to fluorination treatment for stabilizing said unstable terminal groups.

2. The fluororesin composition according to claim 1, wherein the stabilization treatment step (3) comprises bringing the PTFE and FEP into contact with fluorine gas.

3. The fluororesin composition according to claim 1 which contains not more than 50 unstable terminal groups per $1\times10^6$ carbon atoms.

4. The fluororesin composition according to claim 1 which has a melt flow rate [MFR], at 372° C., of 10 to 60 g/10 minutes.

5. The fluororesin composition according to claim 1 which has a melt flow rate [MFR], at 372° C., of 34 to 60 g/10 minutes.

6. The fluororesin composition according to claim 1 which has a melt flow rate [MFR], at 372° C., of 34 to 45 g/10 minutes.

7. The fluororesin composition according to claim 1, wherein the PTFE has an average primary particle diameter of 50 to 800 nm.

8. A covered electric wire comprising a core conductor and a covering made of the fluororesin composition according to claim 1 on said core conductor.

9. A foamed electric wire comprising a core conductor and a covering made of the fluororesin composition according to claim 1 on said core conductor.

* * * * *